(12) United States Patent
Amirzadeh-Asl

(10) Patent No.: US 8,540,816 B2
(45) Date of Patent: Sep. 24, 2013

(54) AGGREGATE AND FILLER EXTRACTED FROM SLAG

(75) Inventor: Djamschid Amirzadeh-Asl, Moers (DE)

(73) Assignee: Sachtleben Chemie GmbH, Duisburg (DE)

( * ) Notice: Subject to any disclaimer, the term of this patent is extended or adjusted under 35 U.S.C. 154(b) by 545 days.

(21) Appl. No.: 12/376,206

(22) PCT Filed: Aug. 10, 2007

(86) PCT No.: PCT/EP2007/058330
§ 371 (c)(1),
(2), (4) Date: May 8, 2009

(87) PCT Pub. No.: WO2008/017724
PCT Pub. Date: Feb. 14, 2008

(65) Prior Publication Data
US 2009/0260542 A1    Oct. 22, 2009

(30) Foreign Application Priority Data
Aug. 10, 2006   (DE) .......................... 10 2006 037 622

(51) Int. Cl.
*C04B 7/147* (2006.01)
(52) U.S. Cl.
USPC .......................................... 106/789; 106/790

(58) Field of Classification Search
USPC .................................................. 106/789, 790
See application file for complete search history.

(56) References Cited

U.S. PATENT DOCUMENTS

| | | | | |
|---|---|---|---|---|
| 4,818,289 | A * | 4/1989 | Mantymaki | 106/789 |
| 4,911,757 | A | 3/1990 | Lynn et al. | |
| 5,593,493 | A * | 1/1997 | Krofchak | 106/714 |
| 6,238,633 | B1 | 5/2001 | Pickens et al. | |
| 6,402,833 | B1 * | 6/2002 | O'Hearn et al. | 106/790 |
| 7,015,167 | B2 * | 3/2006 | Feige et al. | 501/128 |
| 7,135,068 | B2 | 11/2006 | Sorrentino et al. | |
| 2007/0006778 | A1 * | 1/2007 | Kehrmann | 106/697 |
| 2007/0186820 | A1 * | 8/2007 | O'Hearn | 106/789 |

FOREIGN PATENT DOCUMENTS

| | | |
|---|---|---|
| DE | 44 42 559 A1 | 6/1995 |
| EP | 0 542 330 A | 5/1993 |
| EP | 1 630 143 A | 3/2006 |
| FR | 2546530 | 11/1984 |
| JP | 60 202782 A | 10/1985 |
| JP | 2001 259570 A | 9/2001 |
| KR | 2006 023 079 A | 3/2006 |
| WO | WO 01/90019 | 11/2001 |
| WO | WO 2009/115177 | * 9/2009 |

* cited by examiner

*Primary Examiner* — Paul Marcantoni
(74) *Attorney, Agent, or Firm* — Fulbright & Jaworski LLP

(57) ABSTRACT

An aggregate and/or filler extracted from slag, a method for the production thereof, and the use thereof.

34 Claims, No Drawings

AGGREGATE AND FILLER EXTRACTED FROM SLAG

This application is a §371 of PCT/EP2007/058330 filed Aug. 10, 2007, which claims priority from DE 10 2006 037 622.6 filed Aug. 10, 2006.

The present invention provides an aggregate and/or filler extracted from slags, a process for its production and its use.

During the extraction of metals, non-metallic substances are formed from the raw materials employed. In professional circles, these non-metallic substances are divided into ferrous and non-ferrous metallurgical slags.

The non-ferrous metallurgical slags are slags that are obtained as waste during the extraction of metals such as aluminium, chromium, copper, lead etc. They are therefore also referred to as aluminium, chromium, copper and lead slags.

The ferrous metallurgical slags are blast furnace, steelworks and secondary metallurgical slags. The steelworks slags are further differentiated according to the manufacturing process in which they were obtained: for example, LD slags (LDS) are obtained as waste in the production of steel by the Linz-Donawitz process, electric-furnace slags in the production of steel by the electric furnace process and open-hearth slags in the production of steel by the open-hearth process.

Up to the present, these waste products have been utilised in different ways. The majority of ferrous metallurgical slags are used in civil engineering and road building.

Owing to the mineralogical and chemical composition of these slags and to their physical properties, however, further processing steps are needed before the slags can be utilised.

The ferrous metallurgical slags contain $SiO_2 Al_2O_3$, CaO and MgO as the main components. In addition, they also contain iron oxide, free iron and metal and heavy metal oxides (cf. Table 1).

The steelworks slags practically always contain free oxides, particularly free lime (CaO). MgO-rich slags additionally contain free MgO (Table 2).

The use of these slags in civil engineering, e.g. in the form of granulated materials for concrete or road building for the production of base layers, is limited by the free lime or the free MgO present. Both free lime and free MgO can hydrate in the presence of water, which is associated with a volume increase. As a result of this hydration process, the slag can become cracked and can even disintegrate completely. This leads to an undesirable expansion of the concrete or of the roadway in road building.

The proportion of free lime in steel slag can be up to 10 wt. % or more. In the case of MgO, the free proportion is 8 wt. % or more. Furthermore, these slags are highly alkaline, which considerably limits their usability.

In addition, as a result of the manufacturing processes and the raw materials used, the slags contain heavy metals which represent a potential risk during utilisation. For example, some slags contain chromium, which can trigger allergic skin reactions. In the event of eye contact, water-soluble Cr(VI) compounds (chromate) cause severe damage to the cornea (haze, swelling). On the skin, irritations or even chemical burns develop. The inhalation of Cr(VI) compounds leads to damage to the respiratory tract. It is therefore necessary when using slags to adhere to the specifications for the solubility of heavy metals. Some industrial slags contain chromium as a minor constituent and exhibit considerable chromate solubility in water.

FR-A-2 546 530 discloses the treatment of steel slags with respect to their use in cement. Here, at least one compound capable of forming aluminium oxide is added to the liquid slag (melt phase). The necessary amount of heat is introduced to dissolve the substance in the slag and the slag is thoroughly mixed. The slag treated in this way is then intended for use as a hydraulic binder, particularly for cement manufacture.

In another process, the still liquid slag is treated with oxygen and sand. The product does not exhibit any volume expansion and can therefore be used in road building.

WO-A-01/90019 discloses a process for the treatment of steel slags in which gaseous oxygen is blown into the liquid slag and then a source of aluminium or lime and optionally of silicon oxide and/or iron is added to the slag. After cooling and further working up, a hydraulic binder is obtained which can completely replace Portland cement.

A disadvantage of the processes described above is that they are highly technically complex and uneconomical. Moreover, the treatment takes place at temperatures of up to 1500° C., which means that a great deal of energy is consumed. In addition, considerable amounts of various synthetic or natural raw materials have to be used.

In the extraction of aluminium, for example, so-called aluminium salt slag is obtained as non-ferrous metallurgical slag. In addition to $Al_2O_3$ and Al, this slag also contains considerable amounts of aluminium nitride (AlN). The proportion of aluminium nitride can be up to 30 wt. % or more, depending on the process control and the method. Utilisation of aluminium salt slags is impossible owing to the AlN content, because, on contact with air or water, AlN reacts to form undesirable ammonia gas.

Various methods do exist for the work-up and reuse of these Al salt slags. In one work-up method, the salt slag is crushed and the metallic proportion is separated off by grading. The salt components are then washed out with water and the resulting ammonia gases are converted into aluminium sulfate by process gas purification. After filtering off the water-insoluble oxides and crystallising out the dissolved melting salt, products are then formed which can be used as a cheap raw material for the production of cement clinker and mineral wool. Despite complex recovery, however, a residual portion of the aluminium originally present remains unreacted as AlN or as ammonia in the product, as a result of which a distinct odour of ammonia still occurs. Only by heat treatment, particularly by complete drying, can the ammonia be evaporated. However, this process is very complex and uneconomical.

It is an object of the present invention to prepare recyclates which can be produced by a low-cost, energy-saving, technically easily performable recovery process from the slags that are inevitably obtained during the extraction of metals.

Within the meaning of the invention, the term "recyclates" is intended to mean aggregates and fillers which are obtained during the extraction of metals and which contain the components known from ferrous and non-ferrous metallurgical slags, but contain up to less than 3 wt. %, preferably less than 1.5 wt. %, particularly less than 1 wt. % free CaO or free MgO or, in the case of aluminium salt slags, less than 1.5 wt. %, particularly less than 1 wt. % nitrides, such as e.g. aluminium nitride.

It is also an object of the present invention to prepare such recyclates
   for use in concrete, cement, asphalt, fireproof materials, as soundproofing in building construction,
   as a raw material for feeding back into the production process,
   for low-water-permeability coatings such as landfill coverings,
   for filling mine shafts and underground voids, for sealing and consolidating subsoil,
for landscaping or road building,
for use in metallurgy as a slag former,
as a fertiliser,
as aggregate (raw material) for cement manufacture,
as a chromate reducer, particularly for use in cement preparations.

Surprisingly, this object was achieved according to the invention by the features of the main claim and independent. Preferred embodiments are characterised in the subclaims.

The present invention provides recyclates which can be produced by a low-cost, energy-saving, technically easily performable recovery process from the slags that are inevitably obtained during the extraction of metals.

The present invention provides recyclates which are obtained during the extraction of metals and which contain the components known from ferrous and non-ferrous metallurgical slags, but contain up to less than 3 wt. %, preferably less than 1.5 wt. %, particularly less than 1 wt. % free CaO or free MgO.

The present invention also provides recyclates which are obtained during the extraction of metals and which contain the components known from aluminium salt slags, but less than up to 3 wt. %, preferably less than 1.5 wt. %, particularly less than 1 wt. % nitrides, such as e.g. aluminium nitride, and which have a chromate solubility of less than 2 mg/kg.

Surprisingly, a recyclate of this type is obtained according to the invention by reacting the slags obtained during the extraction of metals, for example ferrous and/or non-ferrous metallurgical slags, with additives that contain iron sulfate.

By reacting iron-sulfate-containing additives with, for example, steelworks slags (LD/electric furnace slag) a recyclate is obtained according to the invention in which the free CaO and/or the free MgO is reduced to values of less than 3 wt. %, preferably less than 1.5 wt. %, particularly less than 1 wt. % or, in the case of aluminium salt slags, in which the nitride, e.g. aluminium nitride, is reduced to less than 1.5 wt. %, particularly to less than 1 wt. % nitride, such as e.g. aluminium nitride.

It is known that iron(II) sulfate can be used as a chromate reducer of the chromate(VI) present in cement. This involves the iron(II) sulfate reducing soluble chromium(VI) to insoluble chromium(III).

Moist iron sulfate is obtained as waste in a relatively large quantity as so-called green salt during the production of titanium dioxide. This salt consists of a mixture of $FeSO_4.7H_2O$ (iron(II) sulfate heptahydrate) and $FeSO_4.4H_2O$ (iron(II) sulfate tetrahydrate).

By heat treatment of green salt from a temperature of 80° C., iron(II).$H_2O$ (iron(II) sulfate monohydrate) is obtained.

In principle, it is possible according to the invention to use as the iron-sulfate-containing additive iron(II) sulfate or iron (III) sulfate, individually or mixed together, as a solution, as a moist filter cake or in powdered form. Furthermore, according to the invention the iron sulfates may also contain other metal sulfates.

Preferably according to the invention, however, iron-sulfate-containing green salt is used as the iron-sulfate-containing additive for the reaction with slags.

In another embodiment according to the invention, metal-sulfate-containing sulfuric acids, e.g. waste acid obtained for example during titanium dioxide production or in pickling plants, are used as iron-sulfate-containing additives.

It is possible according to the invention also to use other iron(II)- and/or iron(III)-sulfate-containing spent sulfuric acids, individually or mixed together, in addition to waste acid from titanium-dioxide production.

Iron(II)- and iron(III)-containing spent sulfuric acids are obtained in various chemical processes. For example, during the production of titanium dioxide by the sulfate process, so-called waste acid is obtained with approx. 23% sulfuric acid. This waste acid also contains other metal sulfates in addition to iron(II) sulfate. It is also possible according to the invention to use other spent sulfuric acids that contain iron(II) and/or iron(III) sulfate.

According to the invention, it is preferred to use filter salt as the iron-sulfate-containing additive for the reaction with slags.

Filter salt is obtained as a waste substance during the production of titanium dioxide. As a result of the concentrating of waste acid, iron-sulfate-containing salt mixtures are precipitated during this process. After separating off the sulfuric acid, an iron-sulfate-containing filter cake is obtained which still contains approx. 20 wt. % sulfuric acid adhering thereto. According to requirements and demand for the treatment of slags with filter salt, the filter salt may, according to the invention, contain more or less sulfuric acid. The filter salt may also be used after neutralisation of the sulfuric acid with alkali/alkaline-earth salts, e.g. with CaO, $Ca(OH)_2$ or $CaCO_3$.

The advantage in the use according to the invention of filter salt as the iron-sulfate-containing additive lies in the fact that the basic compounds, e.g. free CaO and/or MgO, in the slag react with the sulfuric acid adhering to the filter salt to form Ca sulfate and/or Mg sulfate, and an inert recyclate is formed. As a result, the free CaO/MgO content can be reduced to values of less than 1 wt. %. Thus, the disadvantageous properties in the use of the known aggregates and fillers, such as volume expansion, cracking and complete disintegration, are reduced. Moreover, the proportion of free CaO and/or MgO can be controlled by the quantity of filter salt added.

This procedure also makes it possible to reduce any soluble chromate present to a level that complies with the statutory provisions for the use of the recyclate.

According to the invention, a recyclate obtained in this way can, in addition, be partly or completely neutralised. The pH can be adjusted in this way in a targeted manner to between 2 and 13, preferably between 4 and 10, particularly preferably between 5 and 9, so that the recyclate according to the invention can be used outstandingly well in a broad field of application.

The reaction according to the invention of the aluminium salt slag with the iron-sulfate-containing additives to be used according to the invention leads to an immediate reaction of undesirably released ammonia gas, which is formed by the reaction of aluminium nitride on contact with air and water, with iron sulfate, and to its being bound in the form of ammonium sulfate or a mixture of Me ammonium sulfates.

Advantageously according to the invention, filter salt, waste acid from titanium dioxide production, iron(II)- and/or iron(III)-sulfate-containing spent sulfuric acids, individually or mixed together, are used as the iron-sulfate-containing additive for the reaction with aluminium salt slags.

The reaction of steelworks slags with filter salt, used as filter cake, can take place in a high-speed mixer. Temperatures of up to 120° C. can arise during this reaction. After cooling, a free-flowing recyclate is obtained according to the invention, which can be used immediately. If necessary, the recyclate can be dried and granulated or ground.

The quantity of iron-sulfate-containing additives, such as e.g. iron(II) sulfate and/or iron(III) sulfate, iron(II)- and/or iron(III)-containing spent sulfuric acids, metal-sulfate-containing iron sulfates and/or filter salt, to be added is, according to the invention, between 0.1 and 95 wt. %, preferably between 0.3 and 75 wt. %, particularly preferably between 1 and 60 wt. %, most particularly preferably between 2 and 40 wt. %.

The grain size of the slags used is between 0.01 and 64 mm, preferably between 0.3 and 50 mm, particularly preferably between 0.5 and 32 mm, most particularly preferably less than 10 mm. Sieve fractions with a grain size between the aforementioned limits may also be used according to the invention. In this way, a recyclate is obtained with a similar grain size.

The grain size of the recyclate is, according to the invention, between 0.01 and 64 mm, preferably between 0.1 and 50 mm, particularly preferably between 0.3 and 32 mm, more particularly preferably between 0.2 and 10 mm, most particularly less than 2 mm.

Other advantageous properties for use as an aggregate and/or filler can be achieved according to the invention if the recyclate is, if necessary, filtered after dispersion in water and optionally washed, optionally heat-treated, preferably dried, and simultaneously or subsequently ground again to form a fine powder or deagglomerated.

As a result of the present invention, it is possible for the first time to combine waste substances which are worthless per se and to prepare recyclates therefrom which have a variety of uses, e.g. in civil engineering, for landscaping or road building, for use in metallurgy or as a fertiliser. By this economically simple method, recyclates can be prepared according to the invention resulting in raw materials savings and thus conservation of natural resources.

These recyclates can be used particularly in civil engineering as aggregate for concrete, cement, asphalt, fireproof materials, as soundproofing in building construction, as a raw material for feeding back into the production process, for low-water-permeability coatings such as landfill coverings, as a filler for filling mine shafts and underground voids, for sealing and consolidating subsoil, for landscaping or road building, for use in metallurgy, e.g. as a slag former, as a fertiliser or aggregate (raw material) for cement manufacture, or as a chromate reducer, particularly for use in cement preparations.

When the recyclate according to the invention is used as a chromate reducer in cement preparations, a hydraulic binder is formed which contains cement as its main component. This hydraulic binder is much sought after as a raw material in civil engineering.

TABLE 1

Characteristic mineral phases of steelworks slags

| Phase | Designation |
|---|---|
| $2\,CaO * SiO_2$ | Dicalcium silicate |
| $3\,CaO * SiO_2$ | Tricalcium silicate |
| $2\,CaO * Fe_2O_3$ | Dicalcium ferrite |
| FeO | Wustite |
| (Ca, Fe)O | Calciowustite |
| (Mg, Fe)O | Magnesiowustite |
| Free CaO | Free lime |
| Free MgO | Periclase |

The invention claimed is:

1. A recyclate comprising components obtained during extraction of metals from an aluminum salt slag, which contains up to 3 wt. % nitrides, wherein said recyclate further comprising an iron-sulfate-containing additive.

2. The recyclate according to claim 1, wherein the nitride is aluminum nitride.

3. The recyclate according to claim 1, having a chromate solubility of less than 2 mg/kg.

4. The recyclate of claim 1, containing less than 1.5 wt. % free CaO or free MgO.

5. The recyclate of claim 1, containing less than 1 wt. % free CaO or free MgO.

6. The recyclate of claim 2, containing less than 1 wt. % nitrides.

7. The recyclate according to claim 1, wherein the iron-sulfate-containing additive comprises at least one member selected from the group consisting of iron(II) sulfate, iron(III) sulfate, iron(II)-containing spent sulfuric acids, iron(III)-containing spent sulfuric acids, metal-sulfate-containing iron sulfates, a mixture of iron(II) sulfate heptahydrate and iron (II) sulfate monohydrate, and a mixture of green salt and filter salt.

8. The recyclate according to claim 1, wherein the iron-sulfate-containing additive is present in an amount of from 0.1 to 95 wt. %.

9. The recyclate according to claim 1, wherein the grain size of the recyclate is between 0.01 and 64 mm.

10. The recyclate according to claim 1, wherein that the pH value of the recyclate is adjusted to between 2 and 13.

11. A process for the production of a recyclate according to claim 1, comprising reacting said slag with an iron-sulfate-containing additive.

12. A process according to claim 11, wherein the iron-sulfate-containing additive is at least one selected from the group consisting of iron(II) sulfate, iron(III) sulfate, iron(II)-containing spent sulfuric acid, iron(III)-containing spent sulfuric acid, a metal-sulfate-containing iron sulfate, a mixture of iron(II) sulfate heptahydrate and iron(II) sulfate monohydrate, and a mixture of green salt and filter salt.

13. A process according to claim 11, wherein the iron-sulfate-containing additive is provided as a solution, as moist filter cake or in powder form.

14. A process according to claim 11, wherein the reaction takes place in a high-speed mixer.

15. A process according to claim 11, wherein the iron-sulfate-containing additive is present in an amount of from 0.1 to 95 wt. %.

16. A process according to claim 11, wherein a grain size of the slag is between 0.01 and 64 mm.

17. A process according to claim 11, wherein the resulting recyclate is dried and granulated or ground.

18. A process according to claim 11, wherein recyclate is dispersed in water, filtered, and ground to a fine powder or deagglomerated.

19. A process comprising adding the recyclate of claim 1 in a metallurgic process.

20. A process for the production of a recyclate according to claim 2, comprising reacting said slag with an iron-sulfate-containing additive.

21. A process according to claim 20, wherein the iron-sulfate-containing additive is at least one selected from the group consisting of iron(II) sulfate, iron(III) sulfate, iron(II)-containing spent sulfuric acid, iron(III)-containing spent sulfuric acid, a metal-sulfate-containing iron sulfate, a mixture of iron(II) sulfate heptahydrate and iron(II) sulfate monohydrate, green salt and filter salt.

22. A process according to claim 20, wherein the iron-sulfate-containing additive is provided as a solution, as moist filter cake or in powder form.

23. A process according to claim 20, wherein the reaction takes place in a high-speed mixer.

24. A process according to claim 20, wherein the iron-sulfate-containing additive is present in an amount of from 0.1 to 95 wt. %.

25. A process according to claim 20, wherein a grain size of the slag is between 0.01 and 64 mm.

26. A process according to claim 20, wherein the resulting recyclate is dried and granulated or ground.

27. A process according to claim 20, wherein recyclate is dispersed in water, filtered, and ground to a fine powder or deagglomerated.

28. A process comprising adding the recyclate of claim 2 in a metallurgic process.

29. The recyclate according to claim 1, having a chromate solubility of less than 2 mg/kg.

30. The recyclate according to claim 1, further comprising an iron-sulfate-containing additive.

31. The recyclate according to claim 30, wherein the iron-sulfate-containing additive comprises at least one member selected from the group consisting of iron(II) sulfate, iron(III) sulfate, iron(II)-containing spent sulfuric acids, iron(III)-containing spent sulfuric acids, metal-sulfate-containing iron sulfates, a mixture of iron(II) sulfate heptahydrate and iron (II) sulfate monohydrate, and a mixture of green salt and filter salt.

32. The recyclate according to claim 30, wherein the iron-sulfate-containing additive is present in an amount of from 0.1 to 95 wt. %.

33. The recyclate according to claim 1, wherein the grain size of the recyclate is between 0.01 and 64 mm.

34. The recyclate according to claim 1, wherein the pH value of the recyclate is adjusted to between 2 and 13.

\* \* \* \* \*